May 5, 1925.
D. F. DOMIZI
1,536,825
BRAKE ACTUATING MECHANISM FOR MOTOR VEHICLES
Filed May 14, 1923
3 Sheets-Sheet 1
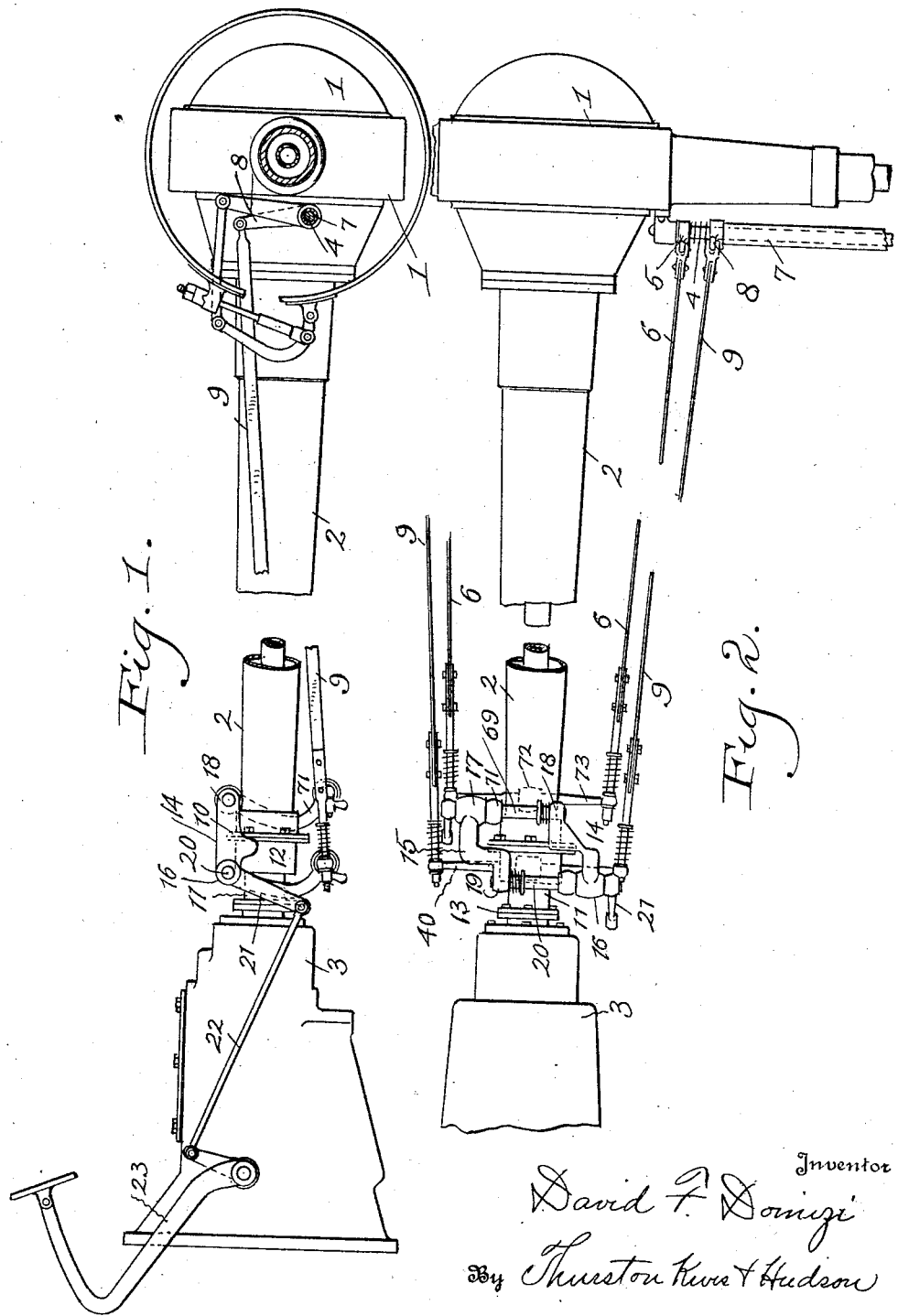

May 5, 1925.
D. F. DOMIZI
1,536,825
BRAKE ACTUATING MECHANISM FOR MOTOR VEHICLES
Filed May 14, 1923
3 Sheets-Sheet 2
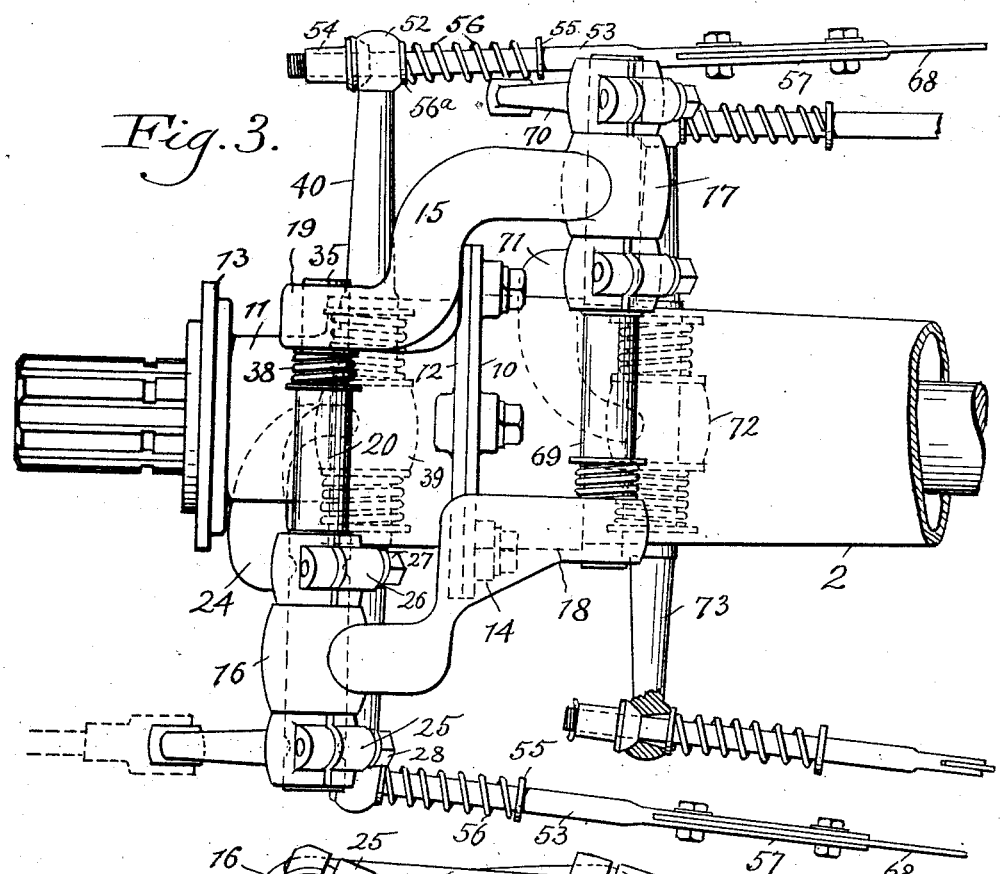
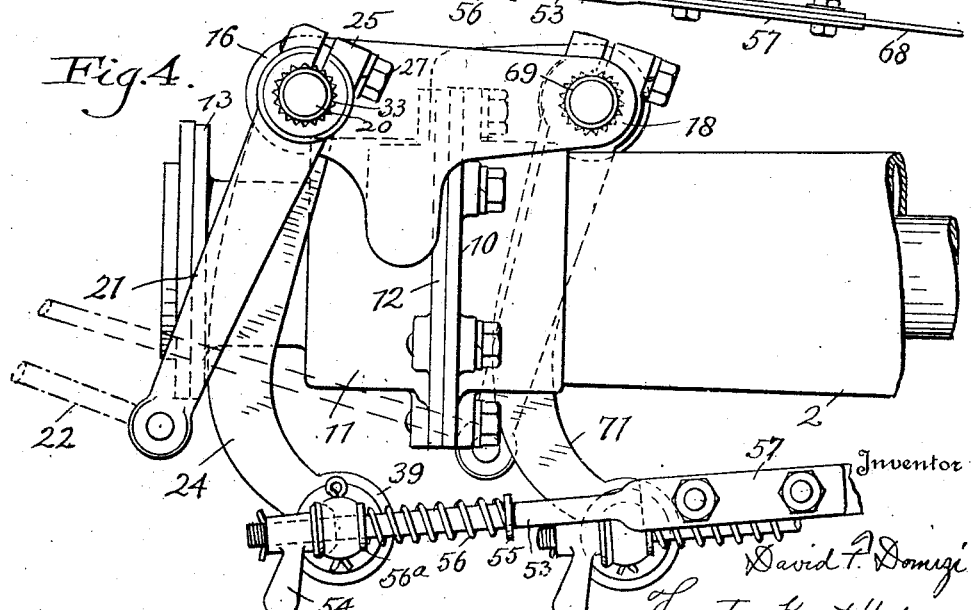
Inventor
David F. Domizi
Thurston Kwis & Hudson
Attorneys May 5, 1925.
D. F. DOMIZI
1,536,825
BRAKE ACTUATING MECHANISM FOR MOTOR VEHICLES
Filed May 14, 1923
3 Sheets-Sheet 3
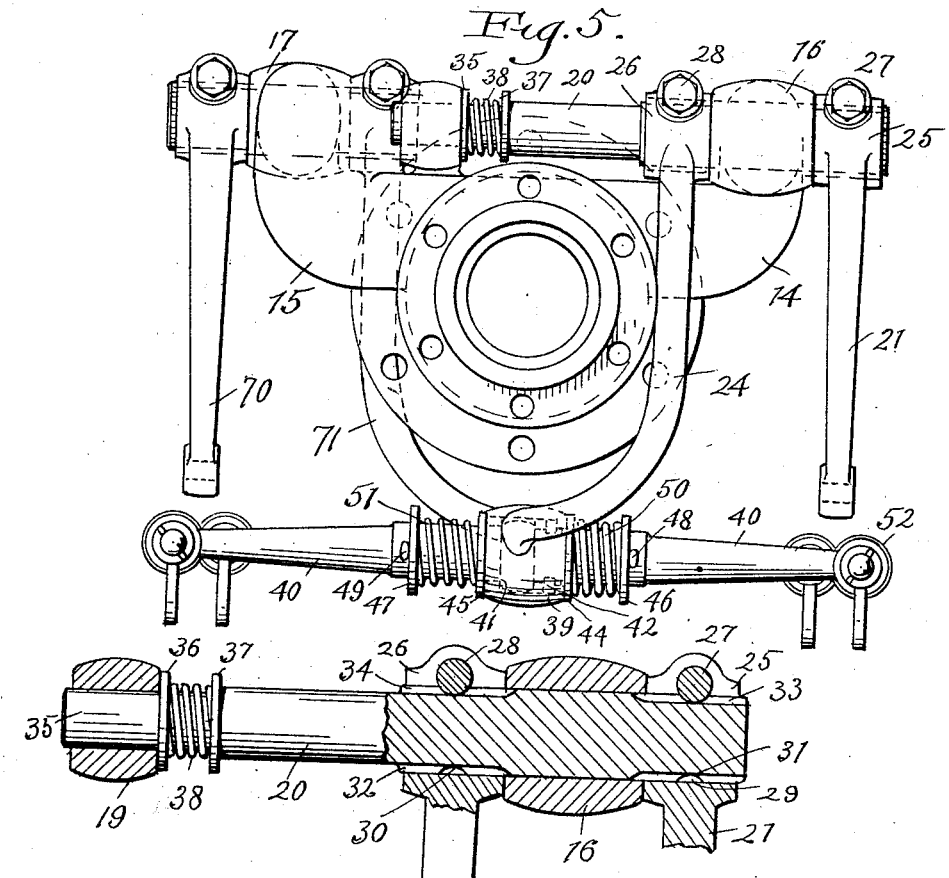
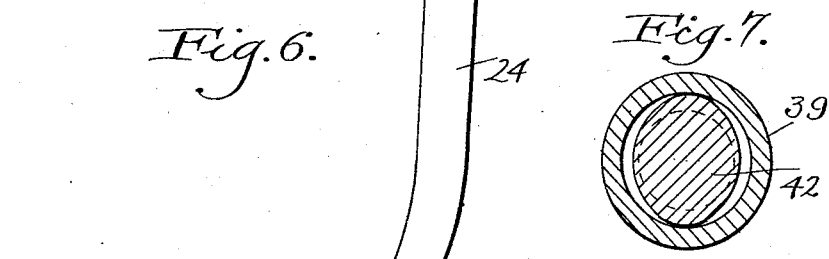
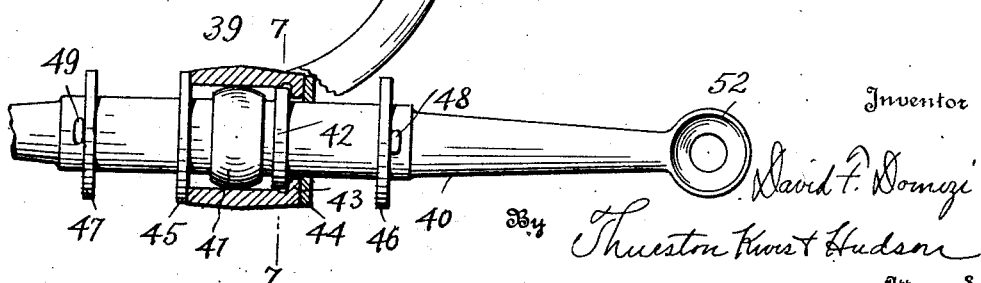
Inventor
David F. Domizi
By Thurston Knorr Hudson
Attorneys

Patented May 5, 1925.

1,536,825

UNITED STATES PATENT OFFICE.

DAVID F. DOMIZI, OF CLEVELAND, OHIO.

BRAKE-ACTUATING MECHANISM FOR MOTOR VEHICLES.

Application filed May 14, 1923. Serial No. 638,709.

*To all whom it may concern:*

Be it known that I, DAVID F. DOMIZI, a citizen of the United States, residing at Cleveland, in the county of Cuyahoga and State of Ohio, have invented a certain new and useful Improvement in Brake-Actuating Mechanism for Motor Vehicles, of which the following is a full, clear, and exact description.

This invention relates to brake mechanism for motor vehicles, and has for its object to provide a brake operating and equalizing mechanism which can be assembled as a unit upon the torque tube and axle housing of a motor vehicle and which can be tested and properly adjusted prior to the assembly of the chassis of the vehicle.

A further object is to provide an equalizing mechanism which is efficient in operation, which can be economically manufactured and which can be quickly assembled.

With these and other objects in view the invention may be said to comprise the elements and combinations thereof as shown in the accompanying drawings, fully described herein and particularly set forth in the appended claims, together with such variations and modifications thereof as will be obvious to persons skilled in the art.

Reference should be had to the accompanying drawings forming a part of the specification in which Fig. 1 is a side elevation of the brake operating mechanism showing the same mounted upon the torque tube and axle housing of a motor vehicle; Fig. 2 is a fragmentary top plan view showing the torque tube and axle housing of a motor vehicle with the brake operating mechanism mounted thereon; Figs. 3 and 4 are a top plan view and side elevation respectively of the brake equalizing device mounted on the torque tube; Fig. 5 is a rear elevation of the brake equalizing mechanism; Fig. 6 is a sectional view showing one of the equalizing bars and the operating means therefor; Fig. 7 is a section on line 7—7 of Fig. 6.

Figs. 1 and 2 of the drawing show the brake operating mechanism mounted upon the rear axle housing 1 and the torque tube 2 which surrounds the driving shaft and connects the differential casing of the rear axle with the transmission casing 3 toward the forward end of the vehicle. The brake operating members carried by the axle housing 1 are of old and well known construction, the emergency brakes being operated by shafts 4 carried by the housing 1 on opposite sides of the differential casing, the shafts 4 being provided with upwardly extending arms 5 connected to brake rods 6. The service brakes upon the exterior of the brake drums are actuated through sleeves 7 which are rotatably mounted upon the shafts 4, the sleeves 7 being provided at their inner ends with upwardly extending arms 8 which are connected to the brake rods 9.

At its forward end the torque tube 2 is provided with an outturned flange 10 and carries an extension in the form of a tubular casting 11 which has a rear flange adapted to be bolted to the flange 10 of the torque tube and a flange 13 at its forward end adapted to be attached to the transmission casing 3. Formed integrally with the casting 11 and extending upwardly therefrom upon opposite sides thereof are bearing brackets 14 and 15, the bracket 14 having an outwardly offset forwardly projecting arm 16 and the bracket 15 having a laterally offset rearwardly projecting arm 17. The brackets 14 and 15 also have bearing arms 18 and 19 extending in directions opposite that of the arms 16 and 17. Journaled in the forward ends of the arms 16 and 19 is a transverse shaft 20 which extends across the top of the casting 11 and serves to actuate the service brakes. Outside the arm 16 the shaft 20 has fixed thereto an arm 21 which extends downwardly and is connected by means of a rod 22 with the service brake lever 23. Inside the bearing arm 16 the shaft 20 has rigidly secured thereto a downwardly extending arm 24 through which the service brake rods are operated. The arms 21 and 24 are provided with split collars 25 and 26 which are clamped upon the shaft 20 by means of clamping bolts 27 and 28 which engage in peripheral grooves 29 and 30 in the shaft 20 to prevent movement of the arms longitudinally of the shaft. The portions of the shaft engaged by the collars 25 and 26 are provided with longitudinally extending serrations 31 and 32 which are engaged by corresponding serrations 33 and 34 upon the interior of the collars 25 and 26. By loosening the clamping bolts 27 and 28, the arms 21 and 24 may be adjusted angularly with respect to the shaft 20 and may be secured in any desired position of angular adjustment. The shaft 20 has a reduced inner end 35 which is journaled in the arm 19. Within the arm 19 a pair of spaced washers 36 and 37 are carried by the reduced portion 35 of the shaft 20. The inner washer 37 bears against a shoulder at the end of the reduced portion 35 and the washer 36 bears against the inner side of the arm 19. A compression spring 38 is interposed between the washers 36 and 37 and serves to take up any longitudinal play of the shaft 20 to prevent rattling.

The arm 24 is curved inwardly and has at its lower end a horizontally disposed cylindrical sleeve 39 which lies directly beneath the axis of the torque tube. An equalizing bar 40 extends through the sleeve 39 and has at the center thereof a ball enlargement 41 which fits slidably and rotatably within the cylindrical sleeve 39. At one side of the ball enlargement 41 the bar 40 is provided with an oval flange 42 the long diameter of which is substantially the same as the diameter of the ball enlargement. The flange 42 engages with an inturned flange 43 at one end of the sleeve 39 to limit the longitudinal movement of the equalizing bar. The oval flange 42 engages with the interior of the sleeve at its upper and lower ends and prevents rocking movement of the equalizer bar 40 in a vertical direction. The sides of the flange 42, however, are spaced sufficiently from the inner wall of the cylinder to permit the equalizing bar to swing horizontally about its center, the ball enlargement 41 forming a rocking support at the center of the equalizing bar. For retaining lubricant within the sleeve 49 and for preventing entry of dirt thereto the ends of the sleeve 39 are engaged by washers 44 and 45 which are slidably mounted upon the equalizing bar 40. Spaced outwardly from the washers 44 and 45 are washers 46 and 47 which are held against outward movement on the bar 40 by means of cotter pins 48 and 49. The washers 44 and 45 are yieldingly pressed against the ends of the sleeves 39 by means of compression coil springs 50 and 51 interposed between the washers 44 and 46 and 45 and 47 respectively. The spring 50 is a relatively strong spring and serves to hold the flange 42 of the equalizing bar in engagement with the flange 43 of the sleeve. The spring 51 is a relatively weak spring and serves merely to hold the washer 45 in engagement with the end of the sleeve 39. The outer ends of the equalizing bar 40 are provided with eyes 52 which are provided on one side with a concave ball seat and have tapered apertures leading to the concave seat. The eyes 52 are adapted to receive threaded ends of the connecting rod end pieces 53, upon the forward ends of which are wing nuts 54 which have ball ends fitting in the concave sockets of the eyes 52. Rearwardly of the equalizing bar 40 the end pieces 53 of the connecting rods are provided with flanges 55 against which are seated the ends of compression coil springs 56 which engage washers 56$^a$ at their forward ends which cover the enlarged ends of the tapered openings of the eyes 52 of the equalizing bar 40. The coil springs 56 serve to yieldingly hold the eyes 52 in engagement with the ball ends of the wing nuts 54 and the washers 56$^a$ serve to retain lubricant within the ball and socket connection and to exclude dirt therefrom. The yielding connection between the equalizing bar and brake rods also prevents rattling The rear ends of the end pieces 53 are provided with forks 57 between which are clamped the steel ribbons 68 forming the body portion of the brake rods 9. When the service brake lever 23 is actuated in a forward direction, the arm 21 fixed to the shaft 20 is also swung in a forward direction, rocking the shaft 20 and the arm 24 in a direction to move the equalizing bar 40 carried by the lower end of the arm 24 in a forward direction. Since the equalizing bar 40 has a horizontal rocking movement with respect to the supporting sleeve 39, the equalizing bar 40 will assume a position within the sleeve 39 such that there will be equal tension upon the two service brake rods 9. Since the equalizing bar 40 is rotatably mounted in the sleeve 39, the swinging movement of the arm 24 will not cause rotative movement of the equalizing bar 40 and the equalizing bar is always properly positioned with respect to the brake rods regardless of the position of the arm 24 and rocks freely in a horizontal direction.

An actuating shaft 69 extends transversely across the top of the torque tube and is journaled in the rearwardly extending arm 17 and 18 in exactly the same manner that the shaft 20 is journaled in the forwardly extending arms 16 and 19 and is provided with arms 70 and 71 upon the outer and inner sides of the bearing arm 17 which correspond to the arms 21 and 24 on the shaft 20, the arm 70 being connected to the emergency brake lever and the arm 71 carrying a sleeve 72 which is exactly the same as the sleeve 39 on the arm 34. Extending through the sleeve 72 of the arm 71 is a horizontal equalizing bar 73 which is exactly the same as the equalizing bar 40 except that it is shorter. The arms 24 and 71 are substantially the same length and the outer ends of the equalizing bar 63 are connected to the emergency brake rods 6 which are positioned inside of the service brake rods 9 by means of connections which are exactly the same as those described for connecting the equalizing bar 40 to the service brake rods 9.

Having described my invention, I claim—

1. In a motor vehicle, a rear axle housing, a torque tube extending forwardly therefrom, a short tubular member adapted to form an extension of the torque tube and to be detachably secured to the forward end thereof and to the transmission casing, brake operating members carried by the axle housing on opposite sides of the torque tube, a brake equalizer carried by said member, and operating connections from said equalizer to said brake operating members.

2. In a motor vehicle, a rear axle housing, a torque tube extending forwardly therefrom, a short tubular member adapted to form an extension of the torque tube and to be detachably secured to the forward end thereof and to the transmission casing, members on the axle for operating the service brakes, members on the axle for operating the emergency brakes, a pair of equalizers mounted on said tubular member, and means connecting one of said equalizers to the service brake actuating members and the other of said equalizers to the emergency brake actuating members.

3. A brake equalizing device comprising a movable actuating arm having a transversely disposed sleeve at the end thereof, an equalizing bar extending through said sleeve and having its central portion rockably mounted in said sleeve, and brake actuating members attached to the outer ends of the bar.

4. A brake equalizing device comprising a movable actuating arm having a transversely disposed sleeve at the end thereof, an equalizing bar extending through said sleeve and rockably and rotatably mounted therein, and brake operating members attached to the outer ends of the bar.

5. A brake equalizing device comprising a movable actuating arm having a cylindrical sleeve at the end thereof, an equalizing bar having a central ball enlargement fitting within the sleeve, stop members on the bar and sleeve for limiting the endwise movement of the equalizing bar in one direction but permitting the bar to rock about its ball enlargement, a spring for yieldingly pressing the bar against the stop, and brake operating members attached to the outer ends of the bar.

6. A brake equalizing device comprising a movable actuating arm having a cylindrical sleeve at the end thereof, an equalizing bar having a central ball enlargement which has a sliding and rotating fit within the sleeve and provides a rocking support for the bar, and a shoulder within the sleeve for limiting the movement of the bar in one direction, a pair of washers slidable on the bar for closing the opposite ends of the sleeve, a pair of coil springs carried by the bar and interposed between said washers and fixed stops on the bar, one of said springs serving to hold the bar against the shoulder and the other of said springs being relatively weak and serving to retain the washer engaged thereby against the end of the sleeve.

7. The combination with the torque tube of a motor vehicle, of a casting secured thereto, bearings at the top of the casting, a shaft journaled in said bearings and extending transversely of the torque tube, two crank arms fixed to said shaft, one of said crank arms adapted to be connected to a brake lever, the other of said crank arms being bent inwardly to position its free end beneath the axis of the torque tube, an equalizing bar pivoted to the free end of said bent crank arm, and brake operating members connected to said equalizing bar.

8. The combination with the torque tube of a motor vehicle, of an equalizing device mounted upon the forward end thereof, said equalizing device comprising a transverse shaft supported above the torque tube, two crank arms fixed to said shaft, one of said crank arms being adapted to be connected to the brake actuating lever, the other of said arms lying alongside the torque tube and bent inwardly to position the free end thereof beneath the torque tube, a sleeve carried by the free end of the bent crank arm, a transversely extending equalizing bar rockably supported in said sleeve, and brake operating members connected to said bar.

9. The combination with the torque tube of a motor vehicle, of an equalizing device mounted on the torque tube, said equalizing device comprising a member secured to the torque tube, front and rear bearings on said member above the torque tube, a pair of transverse shafts journaled in said bearings, an arm fixed to each of said shafts, said arms lying on opposite sides of the torque tube and having their free ends beneath the torque tube, transversely disposed equalizing bars pivoted centrally to the free ends of the arms, brake operating members connected to the free ends of the equalizing bars, and means for rocking the shafts.

10. In a motor vehicle, a torque tube enclosing the vehicle drive shaft, said torque tube having an outturned flange at its forward end, a tubular member adapted to be slipped over the drive shaft and having a flange adapted to be bolted to the flange of the torque tube, bearings carried by said member, a transverse crank shaft journaled in said bearings, an arm fixed to said shaft, an equalizing bar pivoted at its center to said arm, brake operating members connected to the ends of the arm, and means for rocking said crank shaft.

11. An equalizing device comprising a movable actuating arm having a sleeve at the end thereof, an equalizing bar extending through said sleeve, said bar having a ball enlargement at the center thereof slidably and rotatably fitting in said sleeve, an inturned stop shoulder carried by the sleeve, an oval shaped flange on the equalizer bar engaging said shoulder, and means for yieldingly holding said flange against the shoulder.

12. An equalizing device comprising a movable actuating arm having a sleeve at the free end thereof, an equalizing bar extending through said sleeve, said bar having a ball enlargement at the center thereof slidably and rotatably fitted in said sleeve, an internal shoulder carried by the sleeve, an oval shaped flange on the equalizer bar engaging said shoulder, washers carried by the sleeve for closing the ends of the sleeve, and opposed springs carried by the bar and engaging said washers, one of said springs exerting greater pressure than the other whereby said flange is held against said shoulder.

In testimony whereof I hereunto affix my signature.

DAVID F. DOMIZI.